US012803030B2

(12) United States Patent
Chang et al.

(10) Patent No.: US 12,803,030 B2
(45) Date of Patent: Nov. 17, 2026

(54) FUEL CELL APPARATUS

(71) Applicants: HYUNDAI MOTOR COMPANY, Seoul (KR); KIA CORPORATION, Seoul (KR)

(72) Inventors: Sae Kwon Chang, Yongin-si (KR); Jong Jun Lee, Yongin-si (KR); Woo Young Lee, Yongin-si (KR); Yoon Tae Kim, Seongnam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 819 days.

(21) Appl. No.: 18/196,335

(22) Filed: May 11, 2023

(65) Prior Publication Data

US 2024/0145752 A1 May 2, 2024

(30) Foreign Application Priority Data

Nov. 2, 2022 (KR) ........................ 10-2022-0144201

(51) Int. Cl.
*H01M 8/2475* (2016.01)
*H01M 8/0202* (2016.01)
(Continued)

(52) U.S. Cl.
CPC ....... *H01M 8/2475* (2013.01); *H01M 8/0202* (2013.01); *H01M 8/0271* (2013.01); *H01M 8/04029* (2013.01); *H01M 2008/1095* (2013.01)

(58) Field of Classification Search
CPC ............. H01M 8/2475; H01M 8/0202; H01M 8/0271; H01M 8/04029;
(Continued)

(56) References Cited

U.S. PATENT DOCUMENTS

2015/0197165 A1* 7/2015 Katano .................... B60K 1/00 429/470
2018/0309150 A1* 10/2018 Sumikawa ........ H01M 8/04953
(Continued)

FOREIGN PATENT DOCUMENTS

JP 2018147863 A * 9/2018
JP 2020181739 A * 11/2020

OTHER PUBLICATIONS

Denis Candusso, Alexandre De Bernardinis, Marie-Cécile Péra, Fabien Harel, Xavier François, Daniel Hissel, Gérard Coquery, Jean-Marie Kauffmann, Fuel cell operation under degraded working modes and study of diode by-pass circuit dedicated to multi-stack association, Energy Conversion and Management (Year: 2008).*
(Continued)

*Primary Examiner* — Ryan S Cannon
(74) *Attorney, Agent, or Firm* — MCDONNELL BOEHNEN HULBERT & BERGHOFF LLP

(57) ABSTRACT

A fuel cell apparatus of the disclosure includes a case having defined therein a first accommodation space and a second accommodation space, which are isolated from each other by a partition wall, a first cover covering the first accommodation space in the case, a second cover covering the second accommodation space in the case, a power distribution unit disposed in the first accommodation space, and a power conversion unit disposed in the second accommodation space.

18 Claims, 17 Drawing Sheets

(51) Int. Cl.
*H01M 8/0271* (2016.01)
*H01M 8/04029* (2016.01)
*H01M 8/10* (2016.01)

(58) Field of Classification Search
CPC ....... H01M 2008/1095; H01M 8/2465; H01M 8/04; H01M 2250/20; Y02E 60/50; H02M 7/003; H05K 7/20272; H05K 7/01; H05K 7/20927
See application file for complete search history.

(56) References Cited

U.S. PATENT DOCUMENTS

| | | | | |
|---|---|---|---|---|
| 2019/0260058 | A1* | 8/2019 | Sumikawa | H01M 8/0488 |
| 2021/0043961 | A1* | 2/2021 | Itou | H01M 8/04201 |

OTHER PUBLICATIONS

JP-2020181739-A English Translation. Ito Masayuki (Year: 2026).*

* cited by examiner

FUEL CELL APPARATUS

This application claims the benefit of Korean Patent Application No. 10-2022-0144201, filed on Nov. 2, 2022, which is hereby incorporated by reference as if fully set forth herein.

BACKGROUND

Field

Embodiments relate to a fuel cell apparatus.

Discussion of the Related Art

In general, an apparatus including a fuel cell (hereinafter referred to as a "fuel cell apparatus") may include a power distribution unit, which distributes power generated in the fuel cell, and a power conversion unit, which converts the level of the power.

Because the power distribution unit and the power conversion unit are provided separately from each other and mounted to the fuel cell, the fuel cell apparatus has various problems, for example, limitation in reducing the size thereof. Therefore, research with the goal of solving this problem is underway.

SUMMARY

Accordingly, embodiments are directed to a fuel cell apparatus that substantially obviates one or more problems due to limitations and disadvantages of the related art.

Embodiments provide a fuel cell apparatus including a power distribution unit and a power conversion unit, which are disposed so as to exhibit improved performance.

However, the objects to be accomplished by the embodiments are not limited to the above-mentioned objects, and other objects not mentioned herein will be clearly understood by those skilled in the art from the following description.

A fuel cell apparatus according to an embodiment may include a case having defined therein a first accommodation space and a second accommodation space, which are isolated from each other by a partition wall, a first cover covering the first accommodation space in the case, a second cover covering the second accommodation space in the case, a power distribution unit disposed in the first accommodation space, and a power conversion unit disposed in the second accommodation space.

In an example, the first cover may be detachably coupled to the case, and the second cover may be coupled to the case so as not to be detachable.

In an example, the fuel cell apparatus may further include a seal sealing a gap between the first cover and the case and a sealant hermetically sealing a gap between the second cover and the case.

In an example, the case may have an upper surface formed to allow the first cover to be coupled thereto, and the upper surface of the case may have a plurality of grooves formed therein to allow the seal to be fitted thereinto.

In an example, the fuel cell apparatus may further include a third cover covering a trench formed in the bottom of the case to form a cooling flow path, an inlet port disposed in an inlet of the cooling flow path, and an outlet port disposed in an outlet of the cooling flow path.

In an example, each of the power distribution unit and the power conversion unit may include a first component and a second component, and the first component may have a greater calorific value than the second component, and may be disposed closer to the inlet port than the second component.

In an example, each of the power distribution unit and the power conversion unit may include a first component and a second component, and the first component may have a lower endurance limit temperature than the second component, and may be disposed closer to the inlet port than the second component.

In an example, each of the power distribution unit and the power conversion unit may include a heating element.

In an example, the cooling flow path may extend through at least one of the first accommodation space or the second accommodation space.

In an example, the case may have four side surfaces, and at least one of the inlet port or the outlet port may be disposed on at least one of the four side surfaces.

In an example, the inlet port and the outlet port may be disposed adjacent to each other on one of the four side surfaces.

In an example, the trench forming the cooling flow path may have a U-shaped bottom form.

In an example, the trench may include a first portion formed in a bottom defining the first accommodation space among the bottoms of the case, a second portion formed in a bottom defining the second accommodation space among the bottoms of the case, and a third portion penetrating the partition wall to connect the first portion and the second portion to each other.

In an example, the fuel cell apparatus may further include a first fastening part coupling the first cover to the case and a second fastening part coupling the second cover to the case.

In an example, the partition wall may include a lower portion disposed between the first accommodation space and the second accommodation space and an upper portion located on the upper end of the lower portion and formed to allow end portions of the first cover and the second cover, which face each other, to be disposed thereon. The lower portion may have a smaller width than the width of the upper portion in a direction in which the first accommodation space and the second accommodation space are adjacent to each other.

In an example, the fuel cell apparatus may further include a stack diode disposed in the first accommodation space or the second accommodation space.

In an example, the fuel cell apparatus may further include an input bus bar disposed between the power distribution unit and the power conversion unit so as to be connected thereto with passing through the partition wall and an output bus bar disposed between the power distribution unit and the power conversion unit so as to be connected thereto with passing through the partition wall.

In an example, the fuel cell apparatus may further include a fuel cell, and the case may be mounted on the fuel cell.

In an example, the fuel cell apparatus may further include a high-voltage connector connecting the power distribution unit and the power conversion unit to each other.

In an example, the fuel cell apparatus may further include a fuel cell connected to the power distribution unit via the high-voltage connector, and the case may be disposed adjacent to the fuel cell.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

The present disclosure will now be described more fully hereinafter with reference to the accompanying drawings, in which various embodiments are shown. The examples, however, may be embodied in many different forms, and should not be construed as being limited to the embodiments set forth herein. Rather, these embodiments are provided so that this disclosure will be more thorough and complete, and will more fully convey the scope of the disclosure to those skilled in the art.

It will be understood that when an element is referred to as being "on" or "under" another element, it may be directly on/under the element, or one or more intervening elements may also be present.

When an element is referred to as being "on" or "under", "under the element" as well as "on the element" may be included based on the element.

In addition, relational terms, such as "first", "second", "on/upper part/above", and "under/lower part/below", are used only to distinguish between one subject or element and another subject or element, without necessarily requiring or involving any physical or logical relationship or sequence between the subjects or elements.

Hereinafter, a fuel cell apparatus 100 and a method of manufacturing the same according to embodiments will be described with reference to the accompanying drawings. The fuel cell apparatus 100 and the method of manufacturing the same will be described using the Cartesian coordinate system (x-axis, y-axis, z-axis) for convenience of description, but may also be described using other coordinate systems. In the Cartesian coordinate system, the x-axis, the y-axis, and the z-axis are perpendicular to each other, but the embodiments are not limited thereto. That is, the x-axis, the y-axis, and the z-axis may intersect each other obliquely.

Figure 1A:
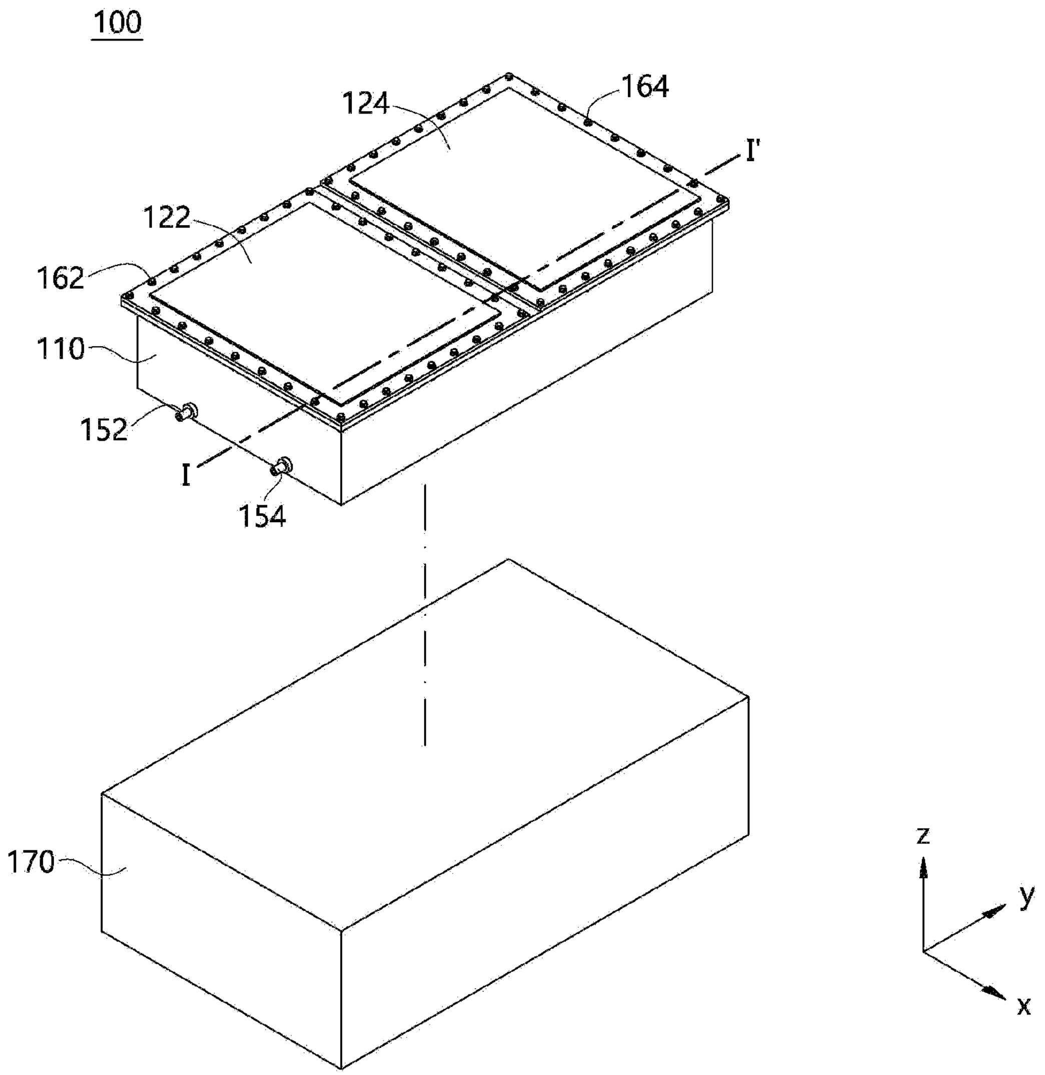
FIG. 1A is an exploded perspective view of a fuel cell apparatus according to an embodiment.
Figure 1B:
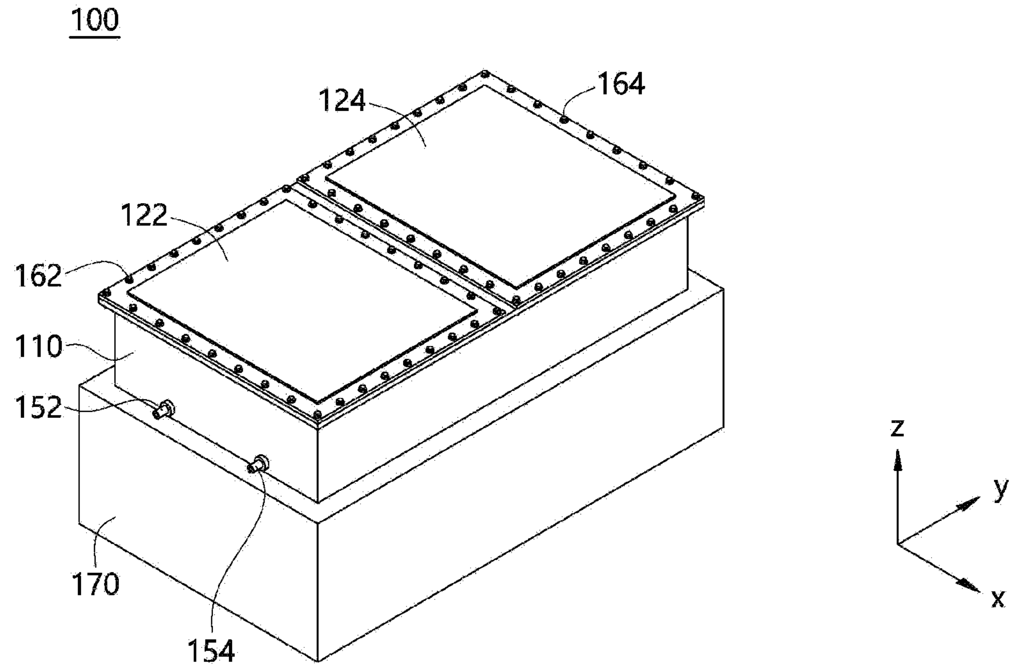
FIG. 1B is a coupled perspective view of the fuel cell apparatus according to the embodiment.
Figure 2A:
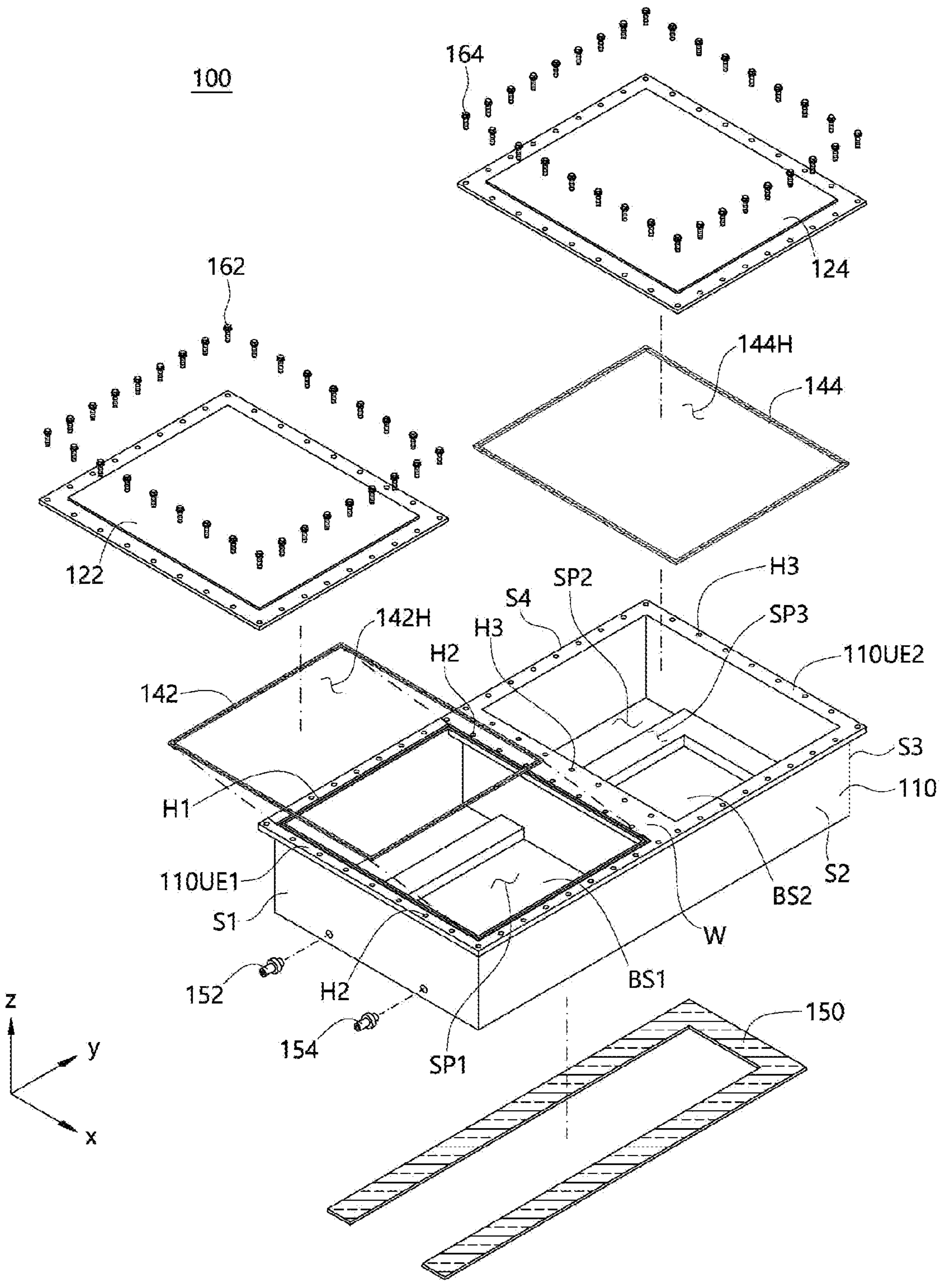
FIG. 2A is an exploded perspective view of the fuel cell apparatus shown in FIGS. 1A and 1B.
Figure 2B:
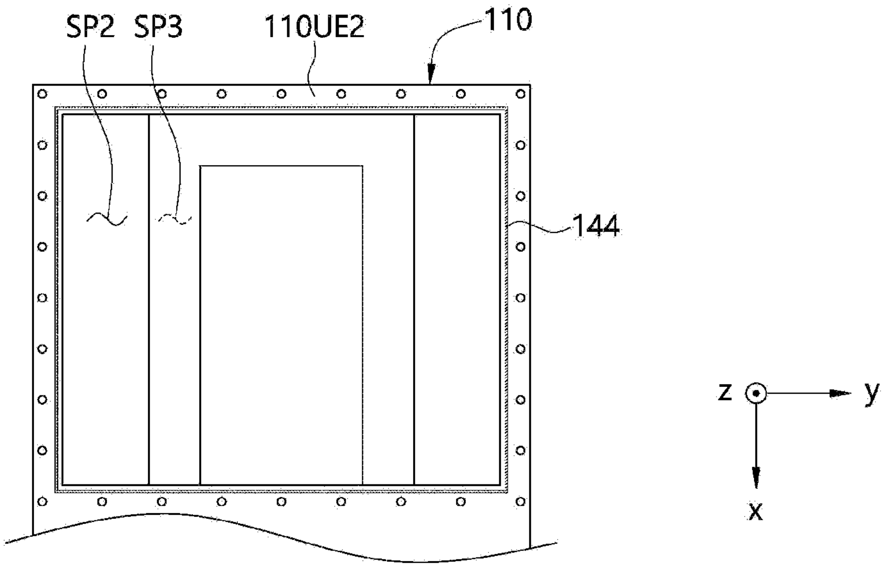
FIG. 2B is a plan view of components defining a second accommodation space in the fuel cell apparatus shown in FIG. 2A.
Figure 3:
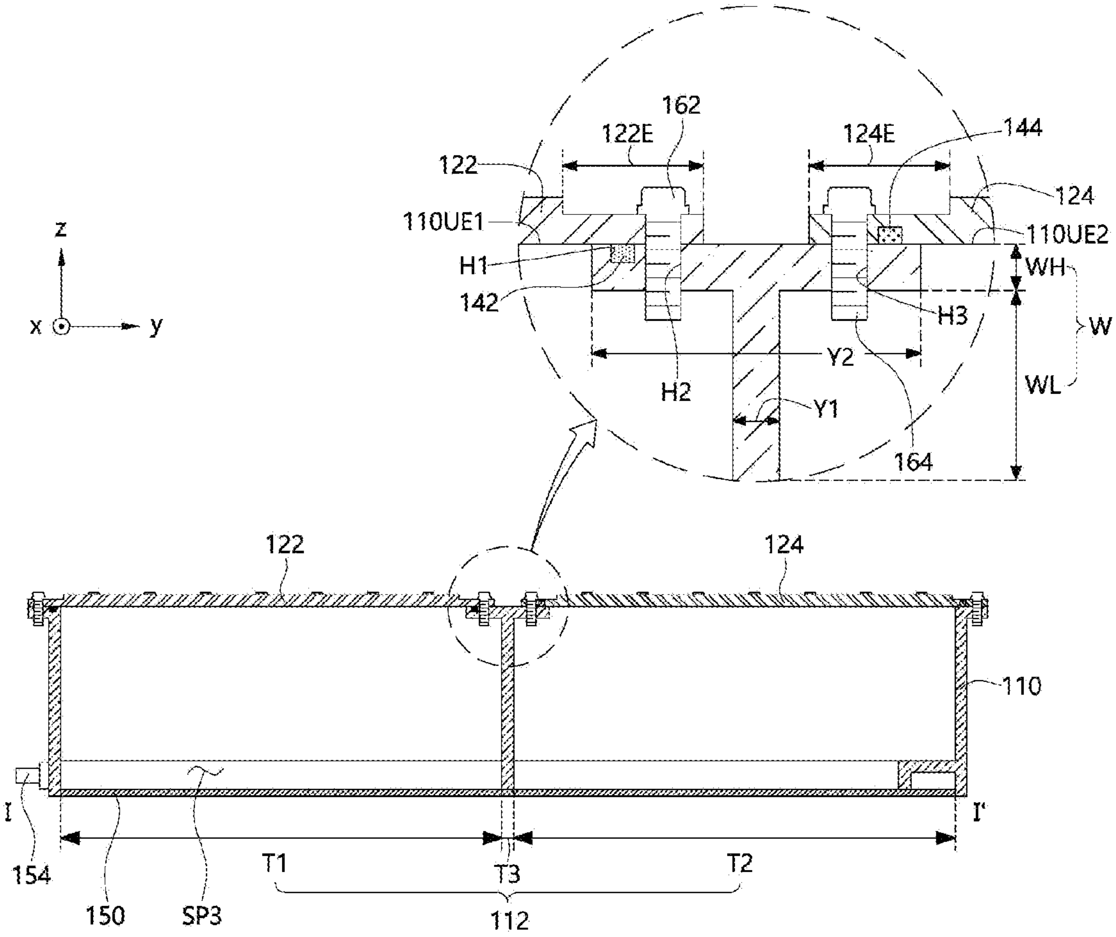
FIG. 3 is a cross-sectional view taken along line I-I' shown in FIG. 1A.
Figure 4A:
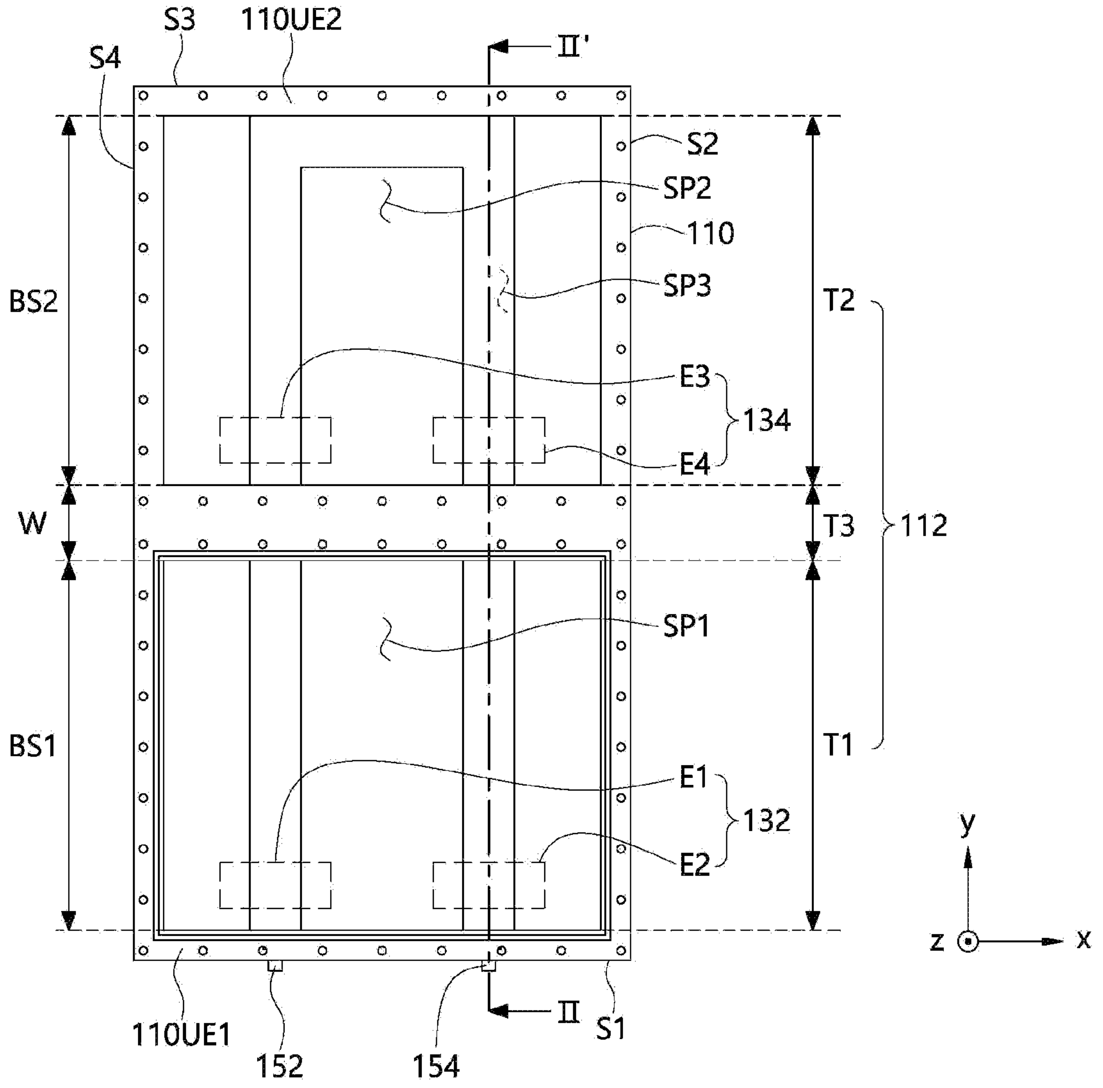
FIG. 4A is a plan view of a case of the fuel cell apparatus shown in FIGS. 1A and 1B.
Figure 4B:
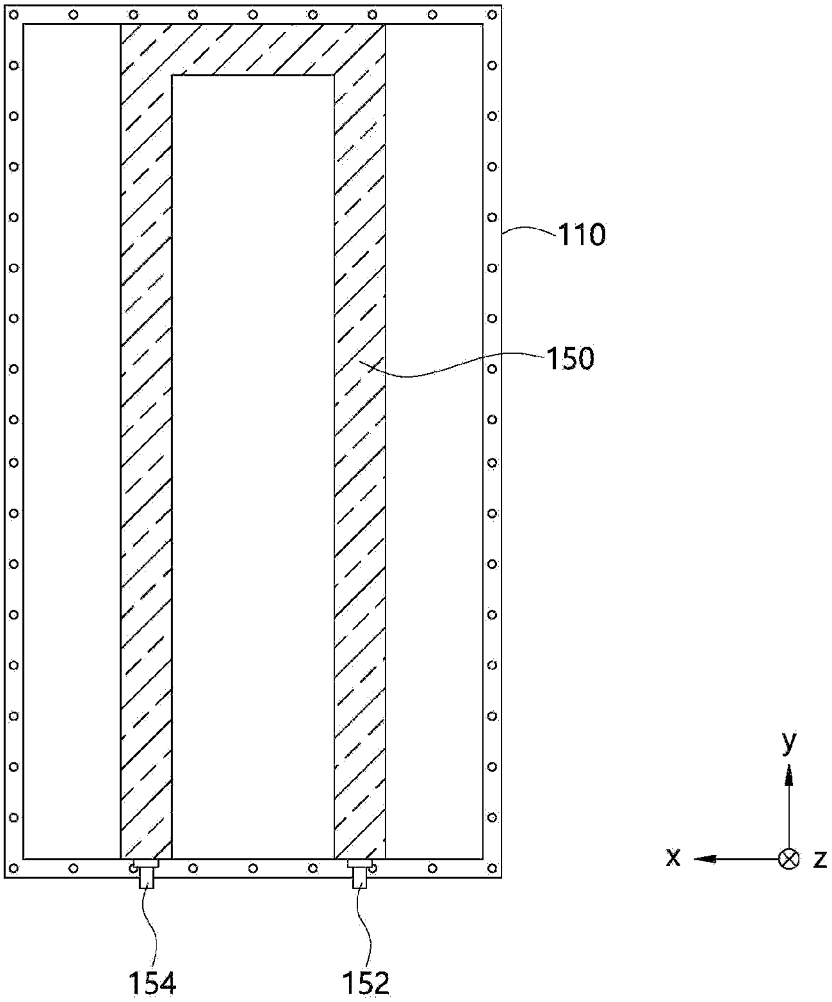
FIG. 4B is a bottom view of the case of the fuel cell apparatus shown in FIGS. 1A and 1B.
Figure 4C:
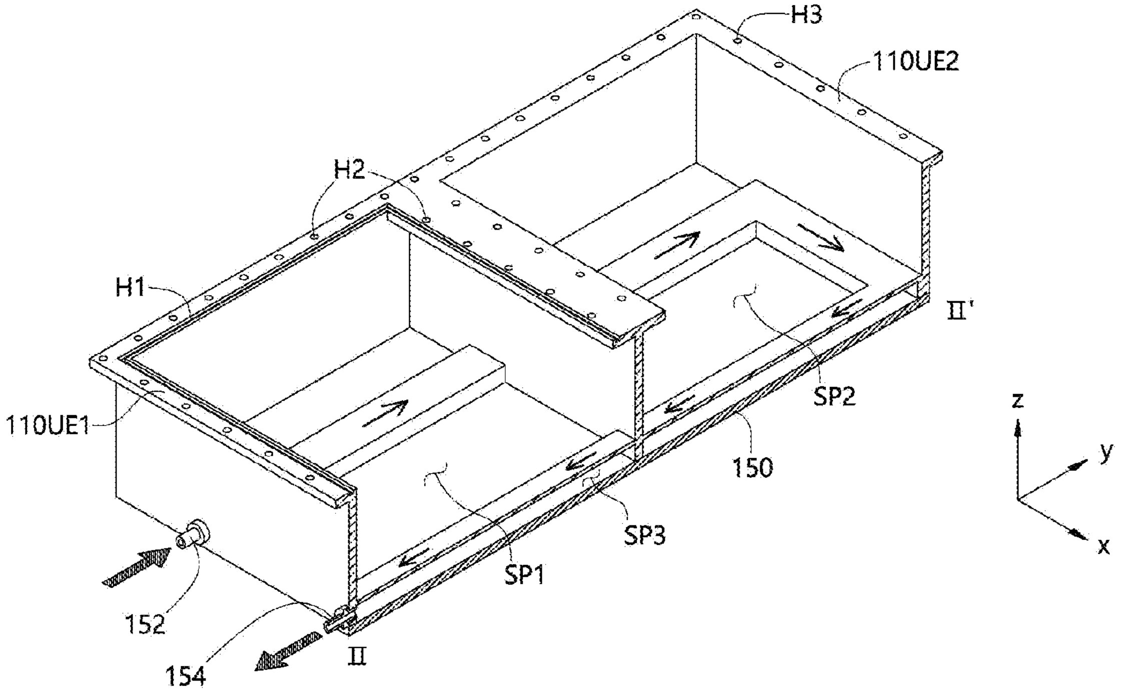
FIG. 4C is a perspective view taken along line II-II' shown in FIG. 4A.

FIGS. 1A and 1B are, respectively, an exploded perspective view and a coupled perspective view of the fuel cell apparatus 100 according to the embodiment, FIG. 2A is an exploded perspective view of the fuel cell apparatus 100 shown in FIGS. 1A and 1B, FIG. 2B is a plan view of components defining a second accommodation space SP2 in the fuel cell apparatus 100 shown in FIG. 2A, FIG. 3 is a cross-sectional view taken along line I-I' shown in FIG. 1A, FIGS. 4A and 4B are, respectively, a plan view and a bottom view of a case 110 of the fuel cell apparatus 100 shown in FIGS. 1A and 1B, and FIG. 4C is a perspective view taken along line II-II' shown in FIG. 4A.

For convenience of description, illustration of a fuel cell 170 is omitted from FIGS. 2A and 3.

The fuel cell apparatus 100 according to the embodiment may include a case 110, first and second covers 122 and 124, a power distribution unit (PDU) (or a junction box or a high-voltage junction box) 132, a power conversion unit 134, and a fuel cell 170.

The fuel cell 170 serves to generate power. The fuel cell 170 may be, for example, a polymer electrolyte membrane fuel cell (or a proton exchange membrane fuel cell) (PEMFC), which has been studied most extensively as a power source for driving vehicles. However, the embodiments are not limited to any specific form of the fuel cell 170.

The power conversion unit 134 converts the level of stack voltage output from the fuel cell 170 and outputs the stack voltage having the converted level to a load of the fuel cell apparatus 100. For example, the power conversion unit 134 may be a high-voltage boosting-type direct-current (DC)/direct-current (DC) converter (or a fuel-cell DC/DC converter (FDC)), which is a kind of boost converter that boosts the stack voltage generated in the fuel cell 170.

The power distribution unit 132 may serve to receive power generated in the fuel cell 170 through a terminal block (not shown) and to distribute the power to nearby high-voltage components (e.g. loads of a vehicle) for operating the fuel cell apparatus 100 through voltage cables. The voltage having a level converted by the power conversion unit 134 may be transmitted to a corresponding component through the power distribution unit 132.

The case 110 includes first and second accommodation spaces SP1 and SP2, which are isolated from each other by a partition wall W. The power distribution unit 132 (or the power conversion unit 134) may be disposed in the first accommodation space SP1, and the power conversion unit 134 (or the power distribution unit 132) may be disposed in the second accommodation space SP2.

Referring to FIG. 3, the partition wall W may include a lower portion WL and an upper portion WH. The lower portion WL is disposed between the first accommodation space SP1 and the second accommodation space SP2 to isolate the first and second accommodation spaces SP1 and SP2 from each other, and the upper portion WH is located on the upper end of the lower portion WL. End portions

122E and 124E of first and second covers 122 and 124, which face each other, are disposed on the upper portion WH.

According to the embodiment, a first width Y1 of the lower portion WL may be smaller than a second width Y2 of the upper portion WH in a direction in which the first accommodation space SP1 and the second accommodation space SP2 are adjacent to each other (e.g. the y-axis direction). The second width Y2 has a value enabling the end portions 122E and 124E to be disposed on the upper portion WH while being spaced apart from each other, and the first width Y1 has as small a value as possible. As the first width Y1 decreases, the sizes of the first and second accommodation spaces SP1 and SP2 in the y-axis direction increase, and thus the size of the fuel cell apparatus 100 in the y-axis direction is reduced.

In addition, as shown in FIG. 2A, the case 110 may include four side surfaces S1, S2, S3, and S4.

The first cover 122 covers the first accommodation space SP1 in the case 110, and the second cover 124 covers the second accommodation space SP2 in the case 110. The first accommodation space SP1 may be defined by a first bottom BS1 of the case 110, the first cover 122, and the partition wall W, and the second accommodation space SP2 may be defined by a second bottom BS2 of the case 110, the second cover 124, and the partition wall W.

The power distribution unit 132 is disposed in the first accommodation space SP1 covered by the first cover 122. The first cover 122 may be detachably coupled to the case 110 so that components included in the power distribution unit 132 are easily replaced or repaired.

The power conversion unit 134 is disposed in the second accommodation space SP2 covered by the second cover 124. Components included in the power conversion unit 134 need to be sealed, rather than being replaced. Therefore, the second cover 124 may be coupled to the case 110 so as to seal the second accommodation space SP2 in order to keep the second accommodation space SP2 clean, rather than facilitating repair or replacement of the components of the power conversion unit 134. Thus, the second cover 124 coupled to the case 110 is not capable of being removed therefrom.

The fuel cell apparatus 100 according to the embodiment may further include a seal 142 and a sealant 144.

The seal 142 serves to seal a gap between the first cover 122 and the case 110. That is, the seal 142 may be disposed between the first cover 122 and a first upper surface 110UE1 of the case 110. In an example, the first upper surface 110UE1 of the case 110, to which the first cover 122 is coupled, may have formed therein a plurality of grooves H1 into which the seal 142 is fitted, and the seal 142 may have a shape of a protrusion that is fitted into the groove H1. In another example, the first upper surface 110UE1 of the case 110, to which the first cover 122 is coupled, may have a protrusion shape, and the seal 142 may have formed therein a groove into which the protrusion shape is fitted. Because the seal 142 is disposed only between the first cover 122 and the first upper surface 110UE1 of the case 110, the seal 142 may have a cavity 142H formed therein.

The seal 142 may have a shape of a rubber ring, but the embodiments are not limited to any specific shape of the seal 142.

Since the seal 142 is disposed between the first cover 122 and the case 110, the first accommodation space SP1 may be kept watertight or airtight from the outside.

The sealant 144 serves to hermetically seal a gap between the second cover 124 and the case 110. That is, the sealant 144 may be disposed between the second cover 124 and a second upper surface 110UE2 of the case 110. In an example, the sealant 144 may be attached to the second upper surface 110UE2 by means of an adhesive. Since the sealant 144 is disposed only between the second cover 124 and the second upper surface 110UE2 of the case 110, the sealant 144 may have a cavity 144H formed therein.

The sealant 144 may keep the second accommodation space SP2 watertight or airtight from the outside to a greater extent than the seal 142.

In addition, the fuel cell apparatus 100 according to the embodiment may include at least one of a first fastening part 162 or a second fastening part 164.

The first fastening part 162 serves to couple the first cover 122 to the case 110, and the second fastening part 164 serves to couple the second cover 124 to the case 110.

In an example, referring to FIG. 3, the first fastening part 162 may be implemented as a bolt, and the first upper surface 110UE1 of the case 110 may include a plurality of screw coupling portions H2 into which the bolt is screwed. The screw coupling portions H2 may be located outside the periphery of the seal 142. Similarly, the second fastening part 164 may be implemented as a bolt, and the second upper surface 110UE2 of the case 110 may include a plurality of screw coupling portions H3 into which the bolt is screwed. The screw coupling portions H3 may be located outside the periphery of the sealant 144.

In addition, the fuel cell apparatus 100 according to the embodiment may further include a third cover 150, an inlet port 152, and an outlet port 154.

The third cover 150 covers a trench 112 formed in the bottom of the case 110 to form a cooling flow path SP3.

The inlet port 152 may be disposed in the inlet of the cooling flow path SP3, and the outlet port 154 may be disposed in the outlet of the cooling flow path SP3. At least one of the inlet port 152 or the outlet port 154 may be disposed on at least one of the four side surfaces S1 to S4 of the case 110.

In an example, as shown in the drawings, the inlet port 152 and the outlet port 154 may be disposed adjacent to each other on one (e.g. S1) of the four side surfaces S1 to S4. The shape of the cooling flow path SP3 and the positions of the inlet port 152 and outlet port 154 may be freely determined so as to effectively increase cooling performance based on thermal analysis, flow analysis, evaluation of the temperature of the fuel cell apparatus 100, and the like.

As shown in FIGS. 2A and 4A to 4C, the trench 112 forming the cooling flow path SP3 may have a U-shaped bottom and plane form, but the embodiments are not limited thereto.

The trench 112 has a shape of a groove that is long and thin and is depressed in the z-axis direction.

According to the embodiment, the trench 112 may include at least one of a first portion T1, a second portion T2, or a third portion T3. Because the third cover 150 covers the trench 112 to form the cooling flow path SP3, the third cover 150 may have a shape corresponding to the trench 112.

The first portion T1 may be a portion formed in the first bottom BS1 defining the first accommodation space SP1 among the bottoms of the case 110, the second portion T2 may be a portion formed in the second bottom BS2 defining the second accommodation space SP2 among the bottoms of the case 110, and the third portion T3 may be a portion penetrating the partition wall W to connect the first portion T1 and the second portion T2 to each other.

According to the embodiment, the cooling flow path SP3 may extend through at least one of the first accommodation space SP1 or the second accommodation space SP2.

According to one embodiment, as shown in the drawings, the cooling flow path SP3 may extend through both the first and second accommodation spaces SP1 and SP2. In this case, the trench 112 may include all of the first to third portions T1, T2, and T3, as shown in FIG. 4A.

According to another embodiment, the cooling flow path SP3 may extend through only one of the first and second accommodation spaces SP1 and SP2. In this case, the trench 112 may include only one of the first and second portions T1 and T2. When the cooling flow path SP3 extends through the first accommodation space SP1 and does not extend through the second accommodation space SP2, the trench 112 may include only the first portion T1. Alternatively, when the cooling flow path SP3 extends through the second accommodation space SP2 and does not extend through the first accommodation space SP1, the trench 112 may be formed only in the second bottom BS2, and the inlet port 152 and the outlet port 154 may be disposed adjacent to each other on the third side surface S3, rather than on the first side surface S1.

Figure 5:
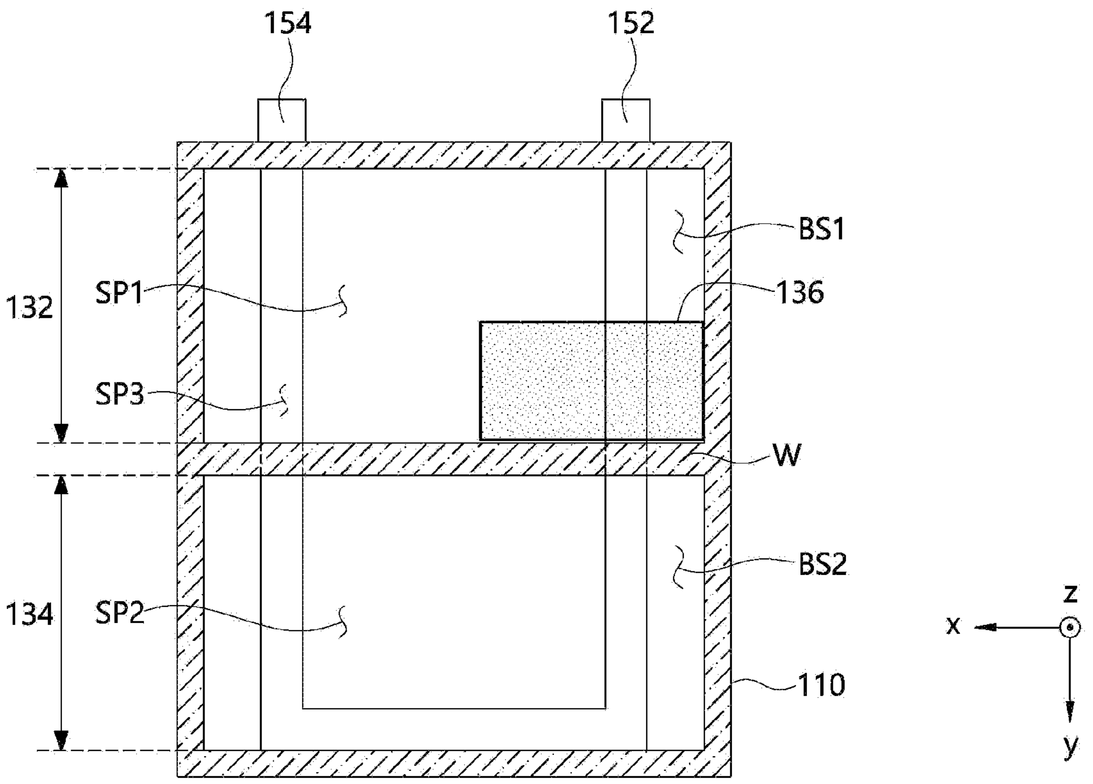
FIG. 5 is a schematic plan view of the fuel cell apparatus according to the embodiment.

FIG. 5 is a schematic plan view of the fuel cell apparatus 100 according to the embodiment.

The fuel cell apparatus 100 shown in FIG. 5 may include a stack diode 136.

According to the embodiment, the stack diode 136 may be disposed in the first or second accommodation space SP1 or SP2. In an example, as shown in FIG. 5, the stack diode 136 may be disposed in the first accommodation space SP1. Alternatively, unlike what is shown in FIG. 5, the stack diode 136 may be disposed in the second accommodation space SP2.

The stack diode 136 is an element for electrically protecting the fuel cell 170. Among the components included in the power distribution unit 132 and the power conversion unit 134, the stack diode 136 may have a relatively large volume and may generate the most heat.

Some of the components included in at least one of the power distribution unit 132 or the power conversion unit 134 may be elements that generate heat (hereinafter referred to as "heating elements"), and the others may be elements that do not generate heat (hereinafter referred to as "non-heating elements").

For example, the power conversion unit 134 may include, as a component, a heating element such as a power module, an inductor, or a capacitor module.

In addition, the power distribution unit 132 or the power conversion unit 134 may include, as a component, a heating element such as the stack diode 136. The stack diode 136 may be disposed at the rear of the cell stack included in the fuel cell 170. Because the power distribution unit 132 and the power conversion unit 134 are also located at the rear of the cell stack, the stack diode 136 may be disposed in the power distribution unit 132 or the power conversion unit 134.

According to one embodiment, at least some of the components included in each of the power distribution unit 132 and the power conversion unit 134 may be heating elements. In an example, all of the components included in the power conversion unit 134 may be heating elements, and only some of the components included in the power distribution unit 132 may be heating elements. In this case, the cooling flow path SP3 may extend through both the first and second accommodation spaces SP1 and SP2.

According to another embodiment, all of the components included in the power conversion unit 134 may be heating elements, and all of the components included in the power distribution unit 132 may be non-heating elements. In this case, the cooling flow path SP3 may extend only through the second accommodation space SP2 and may not extend through the first accommodation space SP1. For example, if the stack diode 136 is included in the power conversion unit 134, the power distribution unit 132 may include, as a component, only a non-heating element such as a fuse or a relay. When the stack diode 136 is disposed in the power conversion unit 134, the cooling flow path SP3 may not be formed in the power distribution unit 132 and may be formed only in the power conversion unit 134.

According to still another embodiment, all of the components included in the power conversion unit 134 may be non-heating elements, and all of the components included in the power distribution unit 132 may be heating elements. In this case, the cooling flow path SP3 may extend only through the first accommodation space SP1 and may not extend through the second accommodation space SP2.

In the embodiment, the components included in each of the power distribution unit 132 and the power conversion unit 134 may be disposed in consideration of at least one of various factors, e.g. a calorific value or an endurance limit temperature. The reason for this is to improve the efficiency of cooling the respective components.

According to one embodiment, when a first component has a greater calorific value than a second component among the components of each of the power distribution unit 132 and the power conversion unit 134, the first component may be disposed closer to the inlet port 152 than the second component.

For example, referring to FIG. 4A, because the power distribution unit 132 has a first component E1 and a second component E2 and the first component E1 has a greater calorific value than the second component E2, the first component E1 may be disposed closer to the inlet port 152 than the second component E2. In addition, because the power conversion unit 134 has a first component E3 and a second component E4 and the first component E3 has a greater calorific value than the second component E4, the first component E3 may be disposed closer to the inlet port 152 than the second component E4.

According to another embodiment, when a first component has a lower endurance limit temperature than a second component among the components of each of the power distribution unit 132 and the power conversion unit 134, the first component may be disposed closer to the inlet port 152 than the second component.

For example, referring to FIG. 4A, because the power distribution unit 132 has a first component E1 and a second component E2 and the first component E1 has a lower endurance limit temperature than the second component E2, the first component E1 may be disposed closer to the inlet port 152 than the second component E2. In addition, because the power conversion unit 134 has a first component E3 and a second component E4 and the first component E3 has a lower endurance limit temperature than the second component E4, the first component E3 may be disposed closer to the inlet port 152 than the second component E4.

According to still another embodiment, among the power conversion unit 134 and the power distribution unit 132, one having a greater calorific value may be disposed closer to the inlet port 152 than the other. In general, components of the power conversion unit 134 generate more heat than components of the power distribution unit 132. In consideration thereof, unlike what is shown in FIG. 4A, the power conversion unit 134 may be disposed in the first accommodation space SP1, in which the inlet port 152 is located, and the power distribution unit 132 may be disposed in the second accommodation space SP2.

According to still another embodiment, the inlet port 152 may be disposed in a unit having a greater calorific value among the power conversion unit 134 and the power distribution unit 132.

According to still another embodiment, the first and second components may be disposed based preferentially on an endurance limit temperature, rather than a calorific value. However, when the first and second components have the same endurance limit temperature, the first and second components may be disposed based on the calorific values thereof. When the first and second components have the same calorific value, the first and second components may be disposed based on the endurance limit temperatures thereof.

As shown in FIG. 4C, coolant may be introduced into the cooling flow path SP3 through the inlet port 152 in a direction indicated by the arrow IN, may flow through the cooling flow path SP3, and may then be discharged to the outside through the outlet port 154 in a direction indicated by the arrow OUT.

Hereinafter, coupling between the components 132, 134, and 170 of the fuel cell apparatus 100 according to the embodiment will be described with reference to the accompanying drawings.

Figure 6A:
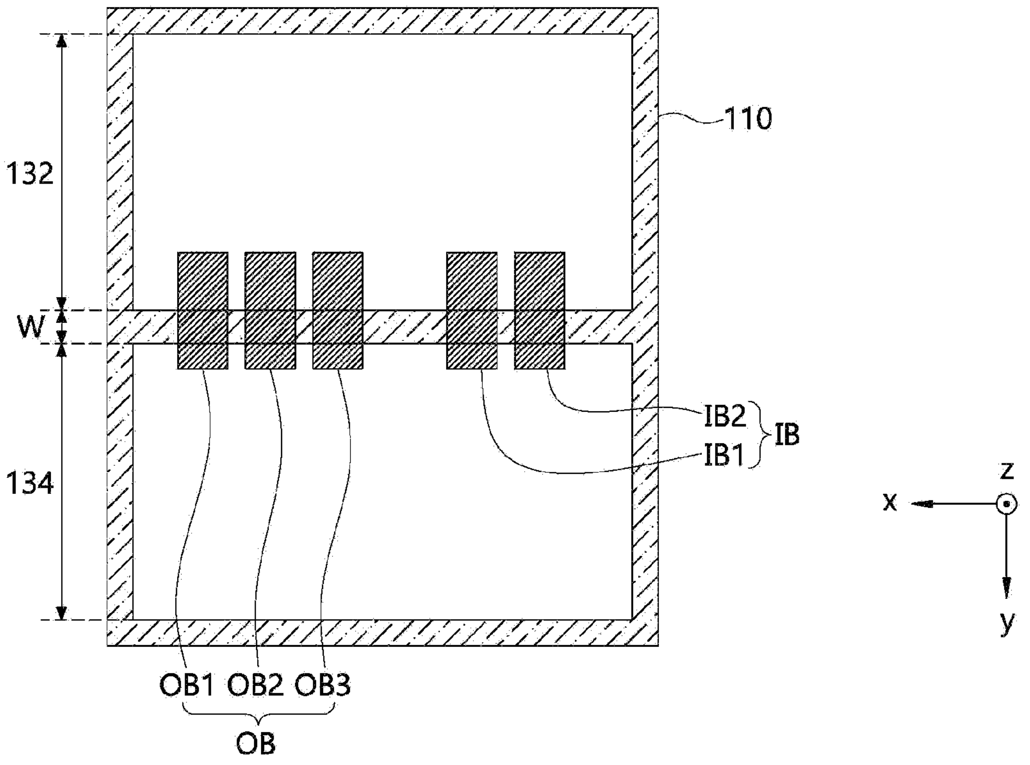
FIG. 6A is a plan view of one embodiment of the fuel cell apparatus.
Figure 6B:
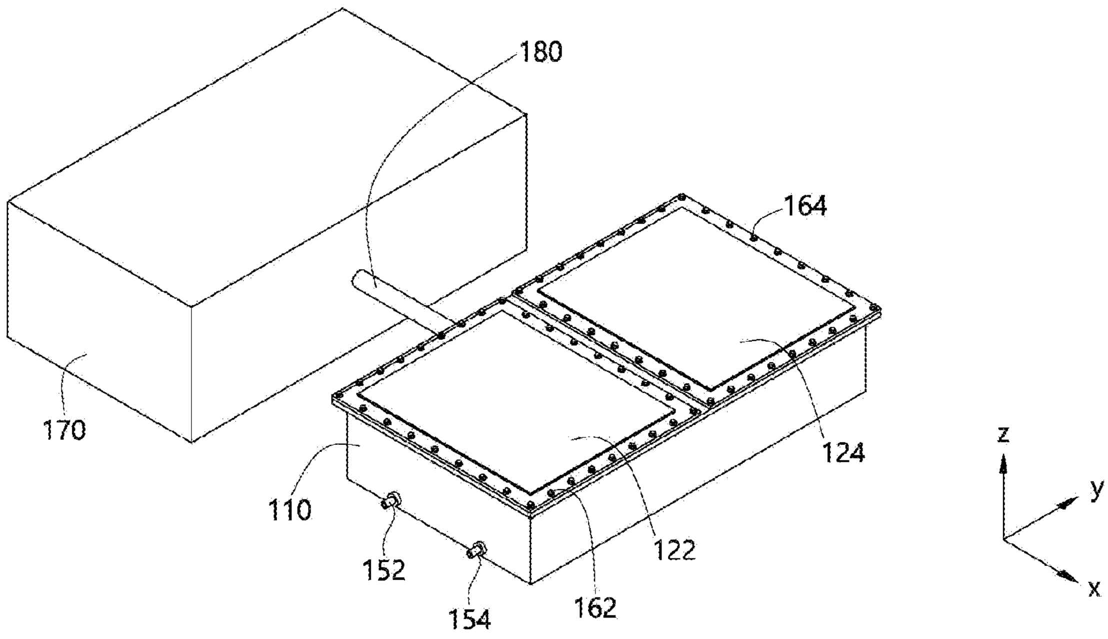
FIG. 6B is a perspective view of another embodiment of the fuel cell apparatus.

FIG. 6A is a plan view of one embodiment of the fuel cell apparatus 100, and FIG. 6B is a perspective view of another embodiment of the fuel cell apparatus 100.

According to one embodiment, when the power distribution unit 132 is connected to the fuel cell 170 via a bus bar, the case 110 may be mounted on the fuel cell 170, as shown in FIGS. 1A to 6A. In this case, the fuel cell apparatus 100 may further include input bus bars IB (IB1 and IB2) and output bus bars OB (OB1, OB2, and OB3). The input bus bars IB (IB1 and IB2) may be disposed between the power distribution unit 132 and the power conversion unit 134 so as to be connected thereto through the partition wall W, and the output bus bars OB (OB1, OB2, and OB3) may also be disposed between the power distribution unit 132 and the power conversion unit 134 so as to be connected thereto through the partition wall W.

According to another embodiment, the fuel cell apparatus 100 may further include a high-voltage connector 180. The power distribution unit 132 may be connected to the fuel cell 170 via the high-voltage connector 180, rather than the bus bars. In this case, as shown in FIG. 6B, the case 110 of the fuel cell apparatus 100 may be disposed adjacent to the fuel cell 170, rather than on the fuel cell 170. That is, when the point of connection to the fuel cell 170 is changed from the bus bar to the high-voltage connector 180, the case 110 may not be mounted on the fuel cell 170.

Hereinafter, a method of manufacturing the fuel cell apparatus 100 according to an embodiment will be described with reference to FIG. 2A.

According to one embodiment, first, the third cover 150 is placed to cover the trench 112 in the z-axis direction to form the cooling flow path SP3.

Thereafter, the inlet port 152 and the outlet port 154 are respectively disposed in the inlet and the outlet of the cooling flow path SP3.

Thereafter, the power distribution unit 132 is disposed in the first accommodation space SP1.

Thereafter, the seal 142 is fitted into the groove H2 in the case 110.

Thereafter, the first cover 122 is coupled to the case 110 using the first fastening part 162 to cover the first accommodation space SP1.

Thereafter, the power conversion unit 134 is disposed in the second accommodation space SP2.

Thereafter, the sealant 144 is attached to the second upper surface 110UE2 of the case 110 using an adhesive.

Thereafter, the second cover 124 is coupled to the case 110 using the second fastening part 164 to cover the second accommodation space SP2.

Thereafter, the case 110 is mounted to the fuel cell 170, thereby completing the manufacture of the fuel cell apparatus 100.

According to another embodiment, first, the third cover 150 is placed to cover the trench 112 in the z-axis direction to form the cooling flow path SP3.

Thereafter, the inlet port 152 and the outlet port 154 are respectively disposed in the inlet and the outlet of the cooling flow path SP3.

Thereafter, the power conversion unit 134 is disposed in the second accommodation space SP2.

Thereafter, the sealant 144 is attached to the second upper surface 110UE2 of the case 110 using an adhesive.

Thereafter, the second cover 124 is coupled to the case 110 using the second fastening part 164 to cover the second accommodation space SP2.

Thereafter, the power distribution unit 132 is disposed in the first accommodation space SP1.

Thereafter, the seal 142 is fitted into the groove H2 in the case 110.

Thereafter, the first cover 122 is coupled to the case 110 using the first fastening part 162 to cover the first accommodation space SP1.

Thereafter, the case 110 is mounted to the fuel cell 170, thereby completing the manufacture of the fuel cell apparatus 100.

In the above-described process, the third cover 150 may be coupled to the trench 112 using, for example, friction stir welding (FSW). However, the embodiments are not limited to any specific scheme for coupling the third cover 150 to the trench 112. For example, a sealant may be applied to the periphery of the trench 112, and the third cover 150 may be coupled to the case 110 using bolts, thereby forming the cooling flow path SP3 so that the coolant does not leak therefrom.

Hereinafter, a fuel cell apparatus 10 according to a comparative example and the fuel cell apparatus 100 according to the embodiment will be described with reference to the accompanying drawings.

Figure 7A:
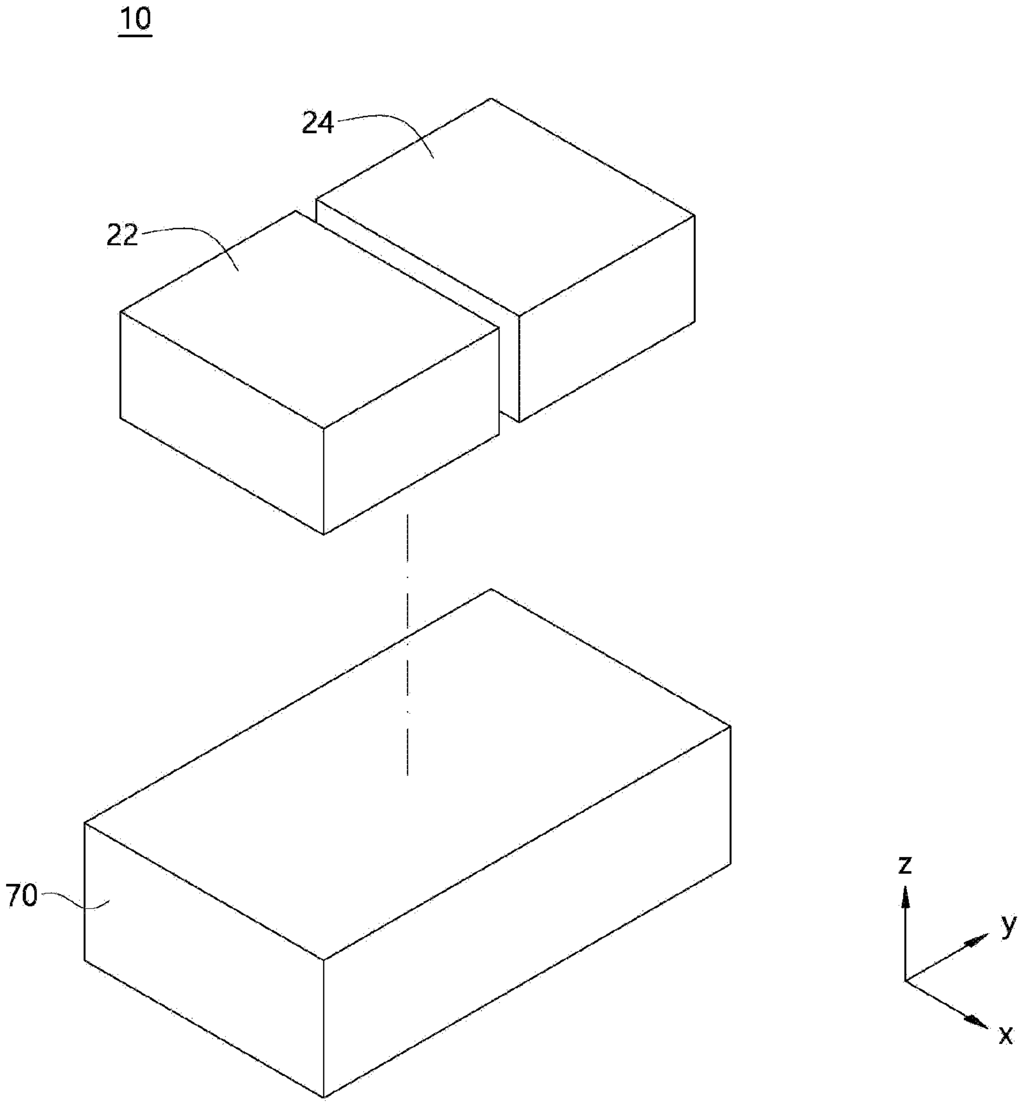
FIG. 7A is an exploded perspective view of a fuel cell apparatus according to a comparative example.
Figure 7B:
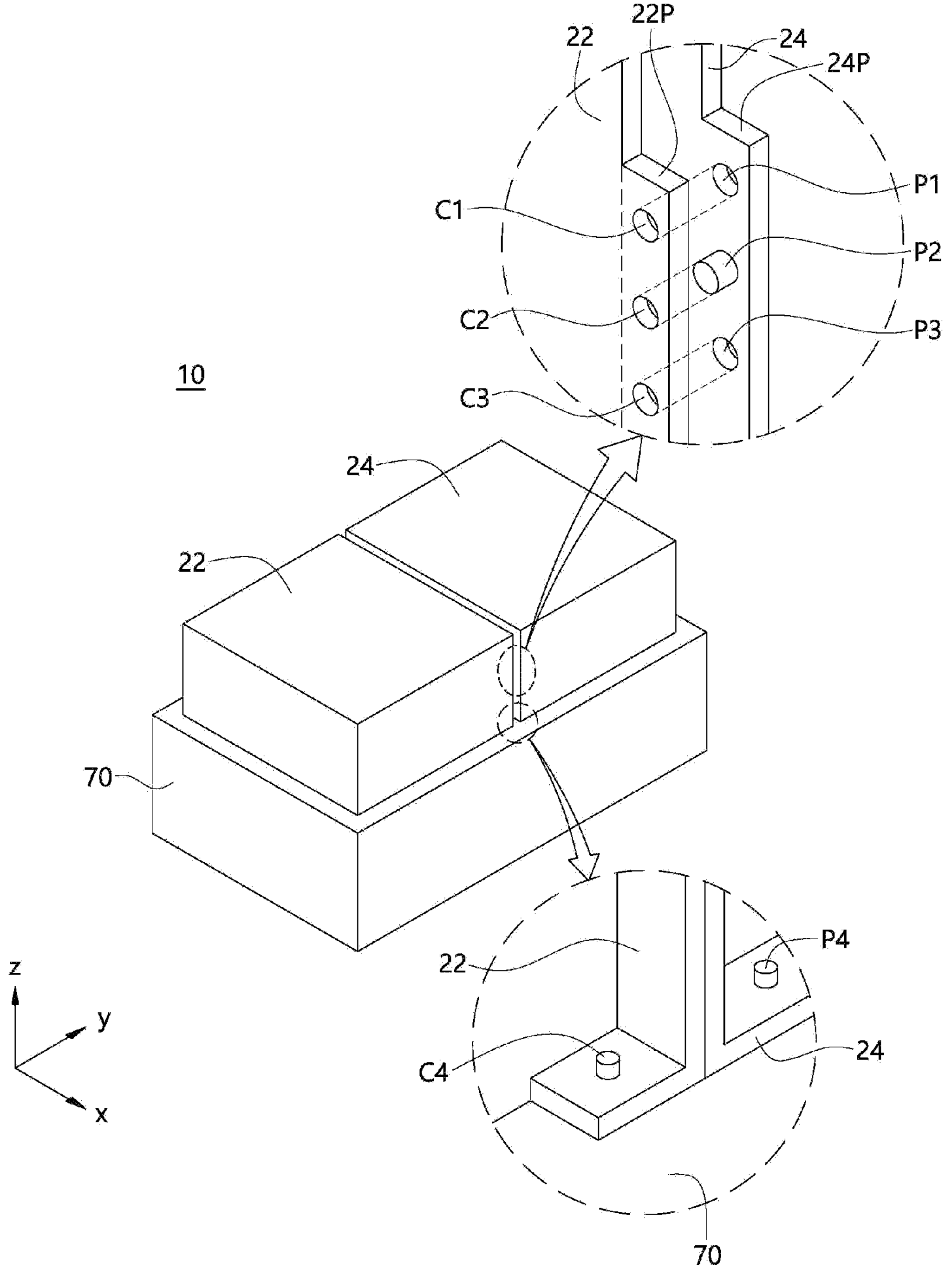
FIG. 7B is a coupled perspective view of the fuel cell apparatus according to the comparative example of FIG. 7A.
Figure 8:
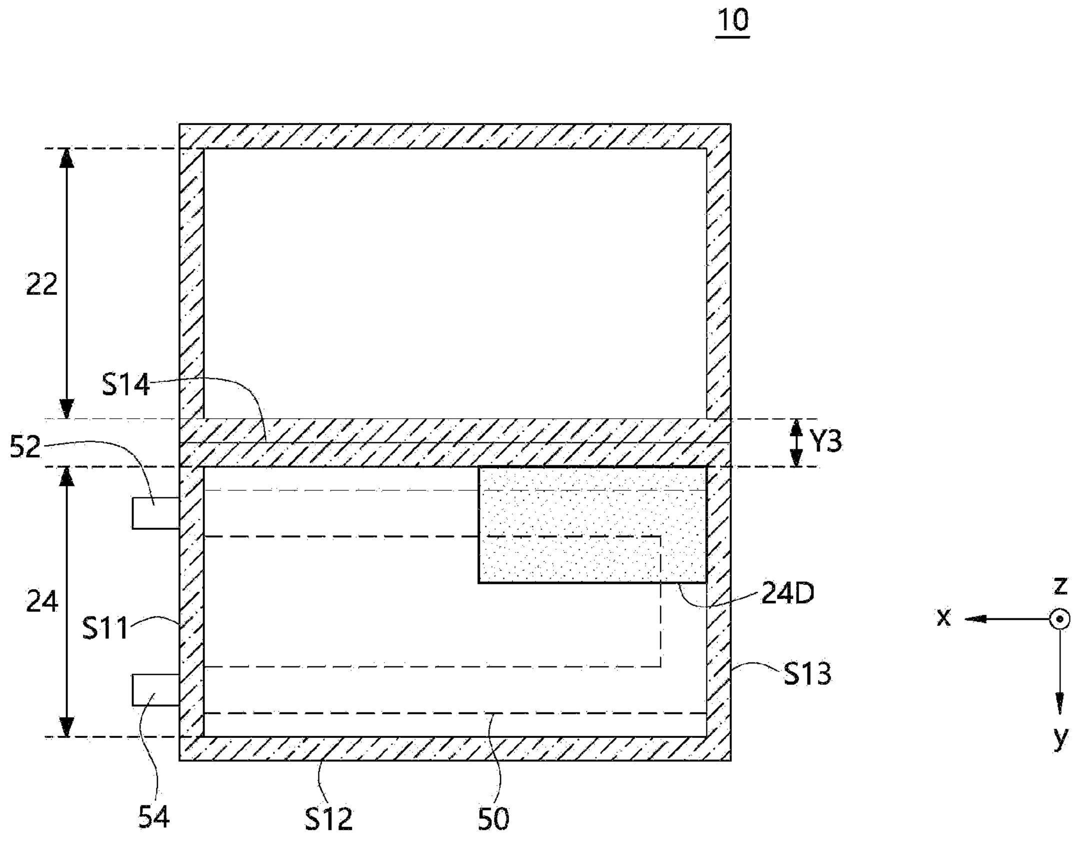
FIG. 8 is a plan view of the fuel cell apparatus according to the comparative example of FIG. 7A.
Figure 9:
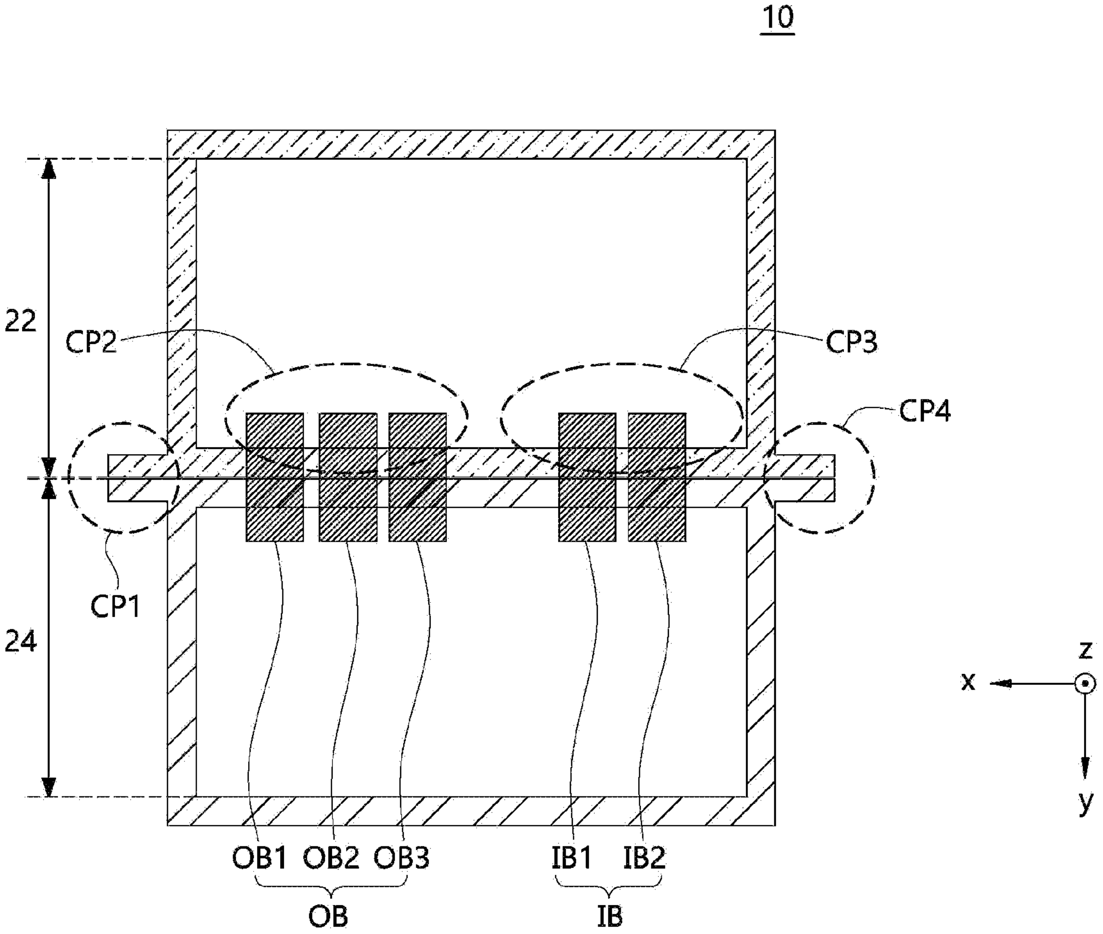
FIG. 9 is a plan view of the fuel cell apparatus according to the comparative example of FIG. 7A.
Figure 10A:
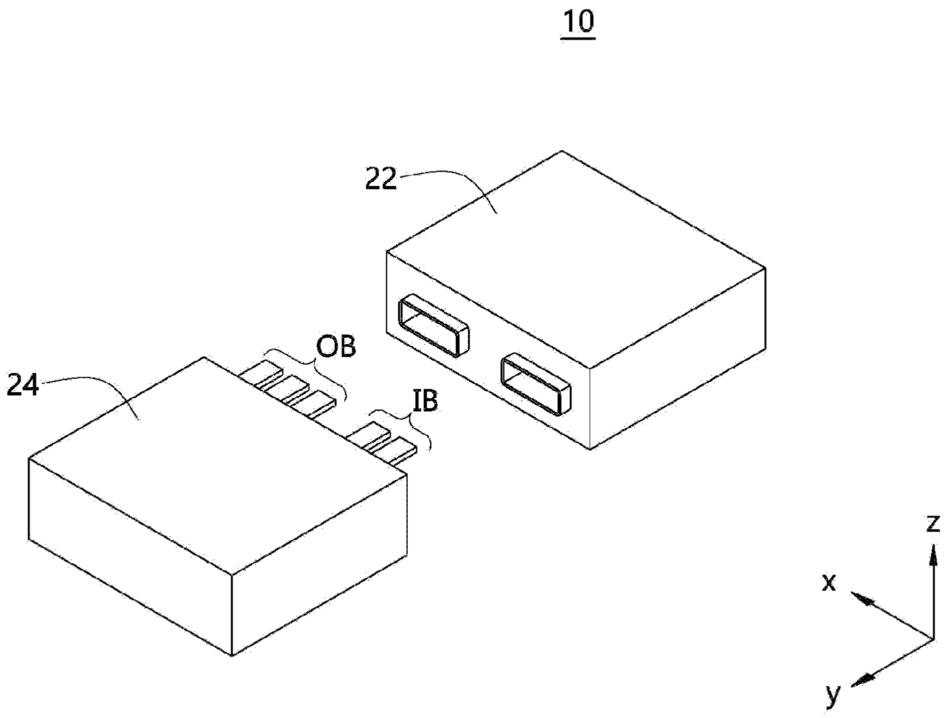
FIG. 10A is an exploded perspective view of the fuel cell apparatus according to the comparative example of FIG. 7A.
Figure 10B:
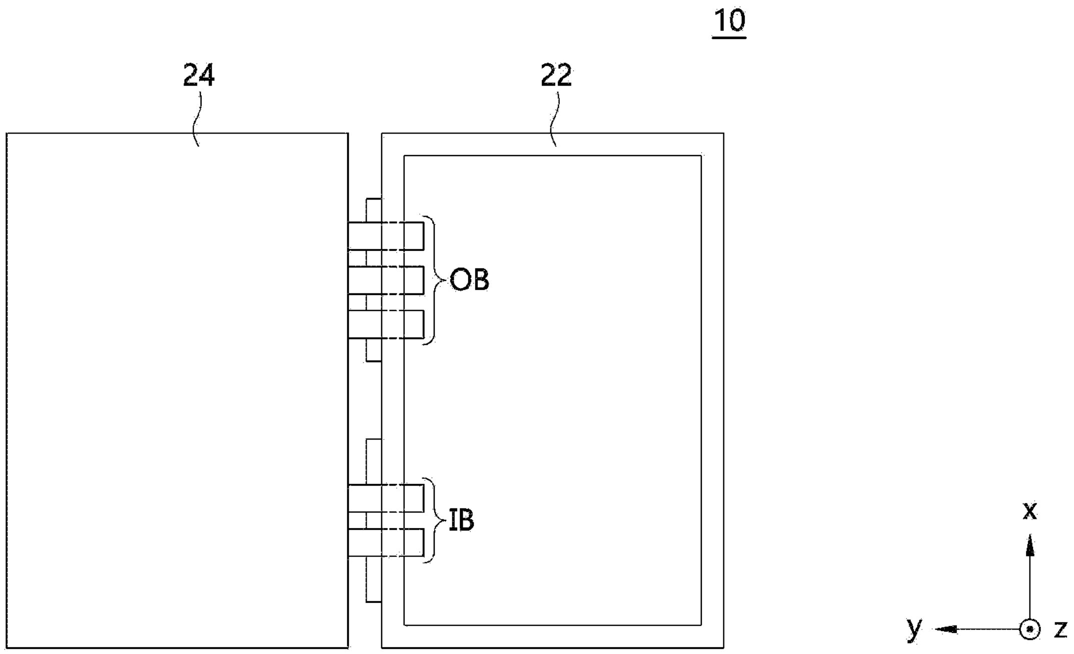
FIG. 10B is a coupled plan view of the fuel cell apparatus according to the comparative example of FIG. 7A.

FIGS. 7A and 7B are, respectively, an exploded perspective view and a coupled perspective view of the fuel cell apparatus 10 according to the comparative example, FIG. 8 is a plan view of the fuel cell apparatus 10 according to the comparative example, FIG. 9 is a plan view of the fuel cell apparatus 10 according to the comparative example, and FIGS. 10A and 10B are, respectively, an exploded perspective view and a coupled plan view of the fuel cell apparatus 10 according to the comparative example.

The fuel cell apparatus 10 according to the comparative example may include a power distribution unit 22, a power conversion unit 24, a fuel cell 70, input bus bars IB, output bus bars OB, and a stack diode 24D. Since the power distribution unit 22, the power conversion unit 24, the fuel cell 70, the input bus bars IB, the output bus bars OB, and the stack diode 24D respectively perform the same functions as the power distribution unit 122, the power conversion unit 124, the fuel cell 170, the input bus bars IB, the output bus bars OB, and the stack diode 136 according to the embodiment, a duplicate description thereof will be omitted.

As shown in the drawings, in the fuel cell apparatus 10 according to the comparative example, the power distribution unit 22 and the power conversion unit 24 are provided separately from each other. Therefore, as shown in FIG. 7B, the power distribution unit 22 includes a first coupling portion (e.g. 22P) in order to be coupled to the power conversion unit 24, the power conversion unit 24 includes a second coupling portion (e.g. 24P) in order to be coupled to the power distribution unit 22, and a fastening member for coupling the first and second coupling portions 22P and 24P to each other is provided. In detail, a screw (not shown) may be fastened into a first through-hole C1 formed in the first coupling portion 22P and a fourth through-hole P1 formed in the second coupling portion 24P, a screw (not shown) may be fastened into a third through-hole C3 formed in the first coupling portion 22P and a fifth through-hole P3 formed in the second coupling portion 24P, and a protruding portion P2 formed on the second coupling portion 24P may be inserted into a second through-hole C2 formed in the first coupling portion 22P, whereby the power distribution unit 22 and the power conversion unit 24 may be coupled to each other. In addition, the power distribution unit 22 may be mounted on the fuel cell 70 by means of a fastening member C4, and the power conversion unit 24 may be mounted on the fuel cell 70 by means of a fastening member P4.

As described above, in the fuel cell apparatus 10 according to the comparative example, portions 22P and 24P for coupling the power distribution unit 22 and the power conversion unit 24, which are provided separately from each other, to each other and screws for coupling the portions 22P and 24P to each other are necessary. In contrast, in the fuel cell apparatus 100 of the embodiment, since the power distribution unit 132 and the power conversion unit 134 are integrally accommodated in the case 110 and are isolated from each other by the partition wall W, the portions 22P and 24P protruding in the x-axis direction or screws for coupling the portions 22P and 24P to each other are not necessary, unlike the comparative example. Accordingly, it is possible to reduce the size of the fuel cell apparatus 100 of the embodiment in the x-axis direction and to simplify the components thereof compared to the comparative example.

In addition, the thickness of the partition wall W in the y-axis direction in the fuel cell apparatus 100 according to the embodiment shown in FIG. 5 is smaller than the total thickness Y3 of the contact portions of the power distribution unit 22 and the power conversion unit 24 in the y-axis direction, which are provided separately from each other in the fuel cell apparatus 10 according to the comparative example shown in FIG. 8. Accordingly, the size of the fuel cell apparatus according to the embodiment in the y-axis direction may be reduced.

As described above, since the fuel cell apparatus 100 according to the embodiment is reduced in size compared to the fuel cell apparatus 10 according to the comparative example, the possibility that the types of vehicles to which the fuel cell apparatus 100 can be applied are restricted by the size of the fuel cell apparatus is lower than in the comparative example. Accordingly, the fuel cell apparatus 100 according to the embodiment may be widely applied to various types of vehicles.

In addition, unlike the comparative example, the fuel cell apparatus 100 of the embodiment does not need the portions 22P and 24P for coupling the power distribution unit 22 and the power conversion unit 24, which are provided separately from each other, to each other. Accordingly, the configuration of the fuel cell apparatus 100 of the embodiment may be simplified, and thus a manufacturing cost and a manufacturing time thereof may be reduced compared to the comparative example. In addition, while the comparative example needs a process of coupling the power distribution unit 22 and the power conversion unit 24, which are provided separately from each other, to each other, the embodiment is configured such that the power distribution unit 132 and the power conversion unit 134 are accommodated in the case 110 without being coupled to each other. Accordingly, a manufacturing time of the fuel cell apparatus 100 of the embodiment may be shortened, and a manufacturing process thereof may be simplified.

In addition, in the case of the comparative example, it is necessary to precisely control an assembly tolerance enabling coupling between the power distribution unit 22, the power conversion unit 24, and the fuel cell 70, which are provided separately from each other, and thus tolerance design may be relatively difficult. In contrast, in the case of the embodiment, since only the case 110 and the fuel cell 170 are coupled to each other, tolerance design may be facilitated compared to the comparative example.

In addition, when the fuel cell apparatus 10 according to the comparative example is applied to a vehicle or the like, vibration frequencies of the power distribution unit 22 and the power conversion unit 24 may differ from each other due to a weight difference therebetween, and thus the portions C1 to C3, P1 to P3, CP1, and CP4 for coupling the power distribution unit 22 and the power conversion unit 24, which are provided separately from each other, to each other may be released from each other, thus deteriorating the reliability of the fuel cell apparatus 10. In contrast, since the embodiment does not have these coupling portions, high reliability may be ensured.

In addition, in the fuel cell apparatus 10 according to the comparative example shown in FIG. 8, a cooling flow path 50, which performs the same function as the cooling flow path SP3 in the embodiment, is formed only in the power conversion unit 24, and thus the stack diode 24D is disposed in the power conversion unit 24. Therefore, there is a limitation on the extent to which the size of the power conversion unit 24 can be reduced. Further, heating elements are not capable of being disposed in the power distribution unit 22, in which the cooling flow path 50 is not disposed, and need to be disposed only in the power conversion unit 24, in which the cooling flow path 50 is disposed. For this reason, there is a limitation on the extent to which the volume of the power conversion unit 24 can be reduced, and as a result, the freedom of design is limited. In contrast, in the fuel cell apparatus 100 according to the embodiment shown in FIG. 5, since the cooling flow path SP3 is disposed in both the power distribution unit 132 and the power conversion unit 134, the stack diode 136 may be disposed in the power distribution unit 132, rather than the power conversion unit 134, and thus the size of the power conversion unit 134 may be reduced compared to the comparative example. Further, since heating elements are divided and disposed in the power distribution unit 132 as well as the power conversion unit 134, the sizes of the power distribution unit 132 and the power conversion unit 134 may be freely adjusted, and thus the volumes of the first and second accommodation spaces SP1 and SP2 in the case 110 may be adjusted to desired values. As a result, the freedom of design may be improved.

In addition, in the case of the comparative example shown in FIG. 8, a cooling flow path (not shown) performing the same function as the cooling flow path 50 may be additionally formed in the power distribution unit 22. In this case, however, an inlet port and an outlet port for the added cooling flow path need to be additionally disposed. In contrast, in the case of the embodiment, although the cooling flow path SP3 is formed to extend through both the power distribution unit 132 and the power conversion unit 134, a single inlet port 152 and a single outlet port 154 are disposed. Accordingly, the embodiment has a simpler configuration than the comparative example.

In addition, in the case of the comparative example shown in FIG. 8, when the power conversion unit 24 has four side surfaces S11, S12, S13, and S14, the fourth side surface S14 of the power conversion unit 24 is in contact with the power distribution unit 22, and thus an inlet port 52 and an outlet port 54 are not capable of being disposed on the fourth side surface S14, and need to be disposed on one of the first to third side surfaces S11, S12, and S13. In this case, if each of the first to third side surfaces S11, S12, and S13 is adjacent to a nearby component, it may be difficult or impossible to mount the inlet port 52 and the outlet port 54. In contrast, according to the embodiment, the inlet port 152 and the outlet port 154 may be freely mounted on any one of the four side surfaces S1 to S4 of the case 110, for example, the power distribution unit 132 or the power conversion unit 134. Accordingly, the freedom of design of the cooling system may be further improved.

In addition, in the case of the fuel cell apparatus 10 according to the comparative example, input bus bars IB (IB1 and IB2) of the power conversion unit 24 are connected to a stack terminal block (not shown) of the power distribution unit 22, and output bus bars OB (OB1, OB2, and OB3) are coupled to bus bars of the power distribution unit 22 by means of bolts or the like. Therefore, in the case in which the fuel cell apparatus 10 according to the comparative example is applied to a vehicle, the power distribution unit 22 and the power conversion unit 24 have different vibration frequencies due to a weight difference therebetween when the vehicle vibrates, and thus portions CP2 and CP3 to which the bus bars are coupled may be released or displaced by vibration. Thus, contact resistance of the portions to which the bus bars are coupled may increase, and as a result, the functional reliability of the fuel cell apparatus 10 may be deteriorated. In contrast, according to the embodiment, since the power distribution unit 132 and the power conversion unit 134 are mounted in a single case 110, the power distribution unit 132 and the power conversion unit 134 have the same vibration frequency, thereby preventing the bus bars from being released or displaced. As a result, the embodiment has high resistance to vibration and improved reliability.

In addition, in the case of the comparative example, because the stack diode 24D is disposed in the power conversion unit 24, when the stack diode 24D fails, the entirety of the power conversion unit 24 needs to be replaced. In contrast, in the case of the embodiment, since the stack diode 136 is disposed in the power distribution unit 132 with excellent maintainability, when the stack diode 136 fails, it is not necessary to replace the entirety of the power conversion unit 134. That is, it is possible to replace only the stack diode 136 by removing the first cover 122 from the case 110. Accordingly, repair and maintenance costs may be reduced.

The fuel cell apparatus according to the above-described embodiment may be applied to vehicles, aircraft, ships, stationary power generation systems, and the like, without being limited thereto.

As is apparent from the above description, the fuel cell apparatus according to the embodiment has a simple configuration and a reduced size, and thus may be widely applied to various types of vehicles. In addition, a manufacturing cost and a manufacturing time thereof may be reduced, a manufacturing process thereof may be simplified, tolerance design thereof may be facilitated, and the freedom of design thereof may be improved. In addition, the embodiment has high resistance to vibration and improved reliability. In addition, repair and maintenance costs may be reduced.

However, the effects achievable through the present disclosure are not limited to the above-mentioned effects, and other effects not mentioned herein will be clearly understood by those skilled in the art from the above description.

The above-described various embodiments may be combined with each other without departing from the scope of the present disclosure unless they are incompatible with each other.

In addition, for any element or process that is not described in detail in any of the various embodiments, reference may be made to the description of an element or a process having the same reference numeral in another embodiment, unless otherwise specified.

While the present disclosure has been particularly shown and described with reference to exemplary embodiments thereof, these embodiments are only proposed for illustrative purposes, and do not restrict the present disclosure, and it will be apparent to those skilled in the art that various changes in form and detail may be made without departing from the essential characteristics of the embodiments set forth herein. For example, respective configurations set forth in the embodiments may be modified and applied. Further, differences in such modifications and applications should be construed as falling within the scope of the present disclosure as defined by the appended claims.

What is claimed is:

1. A fuel cell apparatus, comprising:

a case comprising a first accommodation space and a second accommodation space defined therein, the first accommodation space and the second accommodation space being isolated from each other by a partition wall;

a first cover covering the first accommodation space in the case;

a second cover covering the second accommodation space in the case;

a power distribution unit disposed in the first accommodation space; and a power conversion unit disposed in the second accommodation space, wherein the first cover is detachably coupled to the case and the second cover is coupled to the case so as not to be detachable, and wherein the partition wall comprises:

a lower portion disposed between the first accommodation space and the second accommodation space; and an upper portion located on an upper end of the lower portion and formed to allow end portions of the first cover and the second cover, facing each other, to be disposed thereon, and wherein the lower portion has a smaller width than a width of the upper portion in a direction in which the first accommodation space and the second accommodation space are adjacent to each other.

2. The fuel cell apparatus according to claim 1, further comprising:

a seal sealing a gap between the first cover and the case; and a sealant hermetically sealing a gap between the second cover and the case.

3. The fuel cell apparatus according to claim 2, wherein the case has an upper surface formed to allow the first cover to be coupled thereto, and wherein the upper surface of the case has a plurality of grooves formed therein to allow the seal to be fitted thereinto.

4. The fuel cell apparatus according to claim 1, further comprising:

a third cover covering a trench formed in a bottom of the case to form a cooling flow path;

an inlet port disposed in an inlet of the cooling flow path; and an outlet port disposed in an outlet of the cooling flow path.

5. The fuel cell apparatus according to claim 4, wherein each of the power distribution unit and the power conversion unit comprises a first component and a second component, and wherein the first component has a greater calorific value than the second component, and is disposed closer to the inlet port than the second component.

6. The fuel cell apparatus according to claim 4, wherein each of the power distribution unit and the power conversion unit comprises a first component and a second component, and wherein the first component has a lower endurance limit temperature than the second component, and is disposed closer to the inlet port than the second component.

7. The fuel cell apparatus according to claim 4, wherein each of the power distribution unit and the power conversion unit comprises a heating element.

8. The fuel cell apparatus according to claim 4, wherein the cooling flow path extends through at least one of the first accommodation space or the second accommodation space.

9. The fuel cell apparatus according to claim 4, wherein the case includes four side surfaces, and wherein at least one of the inlet port or the outlet port is disposed on at least one of the four side surfaces.

10. The fuel cell apparatus according to claim 9, wherein the inlet port and the outlet port are disposed adjacent to each other on one of the four side surfaces.

11. The fuel cell apparatus according to claim 4, wherein the trench forming the cooling flow path has a U-shaped bottom form.

12. The fuel cell apparatus according to claim 4, wherein the trench comprises:

a first portion formed in a bottom defining the first accommodation space among bottoms of the case;

a second portion formed in a bottom defining the second accommodation space among the bottoms of the case; and a third portion penetrating the partition wall to connect the first portion and the second portion to each other.

13. The fuel cell apparatus according to claim 1, further comprising:

a first fastening part coupling the first cover to the case; and a second fastening part coupling the second cover to the case.

14. The fuel cell apparatus according to claim 1, further comprising:

a stack diode disposed in the first accommodation space or the second accommodation space.

15. The fuel cell apparatus according to claim 1, further comprising:

an input bus bar disposed between the power distribution unit and the power conversion unit so as to be connected thereto with passing through the partition wall; and an output bus bar disposed between the power distribution unit and the power conversion unit so as to be connected thereto with passing through the partition wall.

16. The fuel cell apparatus according to claim 15, further comprising:

a fuel cell, wherein the case is mounted on the fuel cell.

17. The fuel cell apparatus according to claim 1, further comprising:

a high-voltage connector connecting the power distribution unit and the power conversion unit to each other.

18. The fuel cell apparatus according to claim 17, further comprising:

a fuel cell connected to the power distribution unit via the high-voltage connector, wherein the case is disposed adjacent to the fuel cell.

* * * * *